United States Patent
Badt, Jr.

(10) Patent No.: US 7,039,011 B1
(45) Date of Patent: May 2, 2006

(54) METHOD AND APPARATUS FOR FLOW CONTROL IN A PACKET SWITCH

(75) Inventor: Sig Harold Badt, Jr., Richardson, TX (US)

(73) Assignee: Alcatel, Paris (FR)

( * ) Notice: Subject to any disclaimer, the term of this patent is extended or adjusted under 35 U.S.C. 154(b) by 924 days.

(21) Appl. No.: 10/003,883

(22) Filed: Oct. 31, 2001

(51) Int. Cl.
*H04J 1/16* (2006.01)
*H04J 3/14* (2006.01)

(52) U.S. Cl. ............... 370/230; 370/335; 370/468; 710/36; 710/60

(58) Field of Classification Search ............. 370/389, 370/229, 230.1, 231, 232, 236.1, 234–236, 370/237, 254, 395.4, 360, 412–414, 401, 370/465, 468, 428; 710/36, 52, 56, 57, 60, 710/316; 709/238, 234, 235; 375/240.04–240.07
See application file for complete search history.

(56) References Cited

U.S. PATENT DOCUMENTS

| | | | | |
|---|---|---|---|---|
| 5,329,520 A | * | 7/1994 | Richardson | 370/225 |
| 5,790,522 A | * | 8/1998 | Fichou et al. | 370/236 |
| 5,982,771 A | * | 11/1999 | Caldara et al. | 370/389 |
| 6,118,761 A | * | 9/2000 | Kalkunte et al. | 370/229 |
| 6,141,323 A | * | 10/2000 | Rusu et al. | 370/236 |
| 6,345,040 B1 | * | 2/2002 | Stephens et al. | 370/232 |
| 6,633,568 B1 | * | 10/2003 | Han et al. | 370/395.4 |
| 6,721,273 B1 | * | 4/2004 | Lyon | 370/235 |
| 2001/0036181 A1 | * | 11/2001 | Rogers | 370/389 |
| 2002/0039364 A1 | * | 4/2002 | Kamiya et al. | 370/389 |
| 2002/0141427 A1 | * | 10/2002 | McAlpine | 370/413 |
| 2003/0058802 A1 | * | 3/2003 | Jones et al. | 370/252 |
| 2003/0063348 A1 | * | 4/2003 | Posey, Jr. | 359/139 |

* cited by examiner

*Primary Examiner*—Ajit Patel
*Assistant Examiner*—Chirag Shah
(74) *Attorney, Agent, or Firm*—Anderson, Levine & Lintel; Craig A. Hoersten; V. Lawrence Sewell

(57) ABSTRACT

A network (10) includes a plurality of packet switches (12) for routing data packets. The packet switches (12) include input ports (16) for receiving packets and output ports (20) for sending packets. A matrix (18) passes packets from an input port (16) to a desired output port (20). Input ports (16) include one or more input queues (22) and output ports (16) include an output queue (24). Each input queue (22) is associated with an output queue (24). Control messages for passed between the input ports (16) and output ports (20) for controlling the acceleration of the rate of data transfer between associated input queues (22) and output queues (24).

27 Claims, 4 Drawing Sheets

US 7,039,011 B1

METHOD AND APPARATUS FOR FLOW CONTROL IN A PACKET SWITCH

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to packet switches and, more particularly, to a method and apparatus for efficiently controlling flows between queues in a packet switch.

2. Description of the Related Art

Packet switches (also referred to as "routers") are used throughout communications networks to route information. Typically, a packet switch has input and output ports, with respective input and output queues, to temporarily store data passing through the switch. In order to reduce the probability of overflow, flow control logic is generally required.

Present day flow control logic controls either the absolute quantity of data that can be sent from the input port to the output port or the rate at which data can be sent from input port to output port.

A complicating factor in flow control logic is the time delay in the delivery of the control packets, which regulate the flow. Delivery of flow control packets through the switch slows down the available data flow and, hence, it is preferable to use a few control packets as possible. On the other hand, using long times between data packets increases the chance that the information in the control packet may be out of date. Out of date control information may lead to changes in the flow between input and output queues which increase congestion.

Accordingly, a need has arisen for a packet switch with efficient flow control logic.

BRIEF SUMMARY OF THE INVENTION

In the present invention, a packet switch, comprises one or more output queues for temporarily storing packets to be output from the packet switch and one or more input queues for temporarily storing received packets. Each input queue is associated with an output queue. A matrix passes information between said inputs queues and said output queues. Control signals are generated to control the change of a transfer rate between associated input queues and output queues.

The present invention provides significant advantages over the prior art. By controlling the change in the transfer rate, the flow of packets can be more efficiently controlled, using fewer control cycles.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–9 of the drawings, like numerals being used for like elements of the various drawings.

Figure 1:
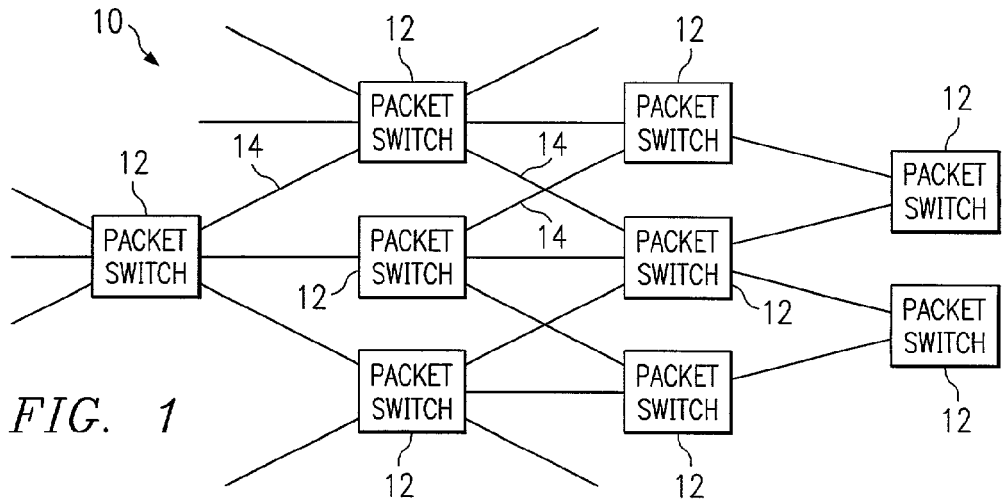
FIG. 1 illustrates a block diagram of a network.

FIG. 1 illustrates a basic diagram of a network 10 using packet switches 12 to route data packets over lines 14. The packet switches route incoming packets to a selected destination. The actual configuration of the network 10 is for example only; an actual network 10 would typically be much more complicated than that shown in FIG. 1.

Typically, at least some of the packets received by a packet switch 12 do not pass directly to an output. These packets are temporarily stored in the packet switch in a memory or "queue". If a queue becomes full, additional incoming packets will cause some packets to be dropped. The dropped packets may be the newly received packets or packets already in the queue, depending upon the implementation of the packet switch 12. Naturally, it is desirable to drop as few packets as possible.

Figure 2:
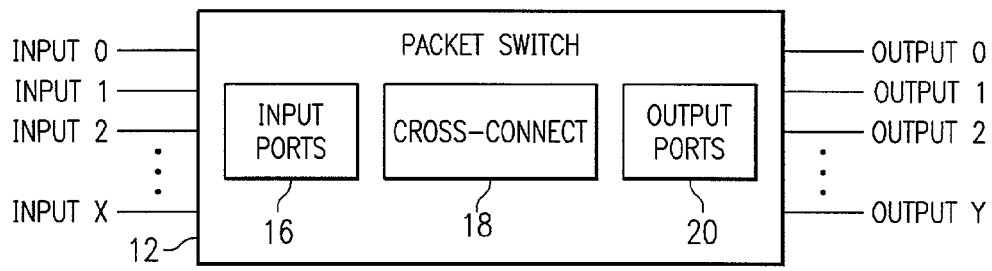
FIG. 2 illustrates a block diagram of a packet switch.

FIG. 2 illustrates a basic diagram of a packet switch 12. Each packet switch 12 is connected to one or more input lines 14. Packets from these lines are received at the input ports 16, which include the input queues (see FIG. 3). A matrix 18 allows a packet from any of the input ports 16 to a selected output port 20. The output ports 20 are coupled to the lines 14 to send packets to other packet switches 12.

Figure 3:
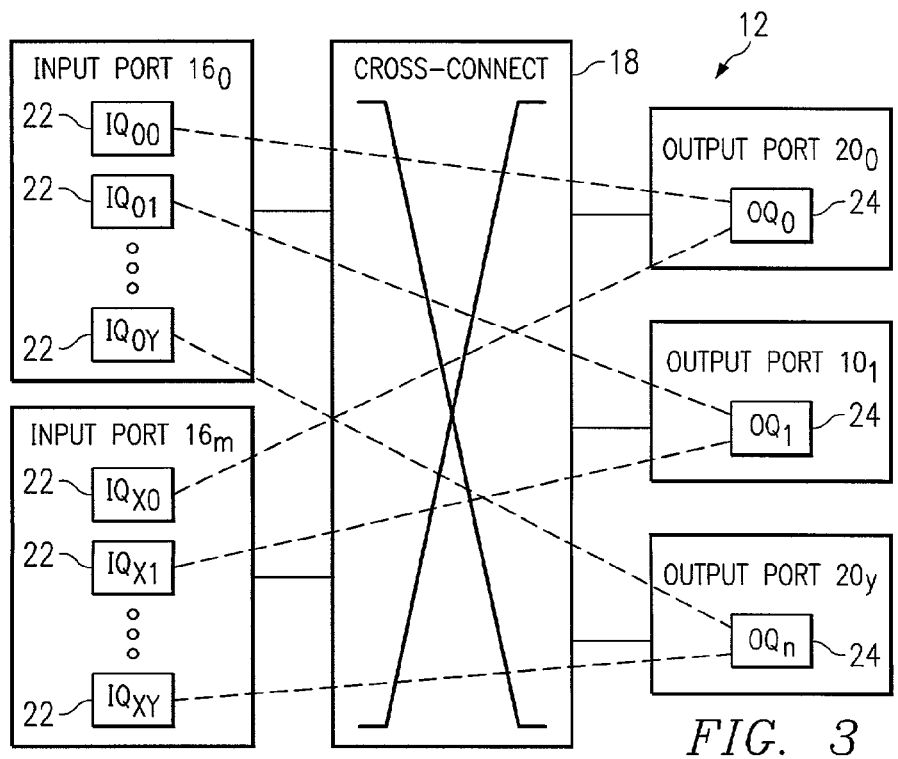
FIG. 3 illustrates a more detailed block diagram of the packet switch of FIG. 2.

FIG. 3 illustrates a more detailed block diagram of a packet switch 12. In the illustrated embodiment, the packet switch 12 has x+1 input ports 16 (individually shown as output ports $16_0$ through $16_x$) and y+1 output ports 20 (individually shown as output ports $20_0$ through $20_y$). Each input port 16 includes up to y+1 memory queues 22, each queue corresponding to a respective output port 20. Each output port 20 has an output queue 24. For reference, individual input queues are shown as $IQ_{port,queue}$ and individual output queues are shown as $OQ_{port}$.

In operation, as packets are received by an input port 20, each packet is placed in the queue 22 corresponding to the desired output port 20. Under control of the input port 16, a packet at the front of a selected input queue 22 will pass through the matrix 18 to the corresponding output queue 20 on each matrix cycle. The output queues 20 will transmit packets to outgoing lines 14, but possibly not as fast as the packets are received from the input ports 16.

Hence, if a large number of received packets are directed to a particular output port 20, the input queues 22 corresponding to that output port 20 will tend to be more occupied than the queues corresponding to other output ports. Similarly, the output queue 24 corresponding to a popular output port 20 can be more occupied than less popular output queues 24. If either the input queues 22 or output queues 24 become full, packets will be dropped, which may cause the source of the packets to resend the packets.

Figure 4:
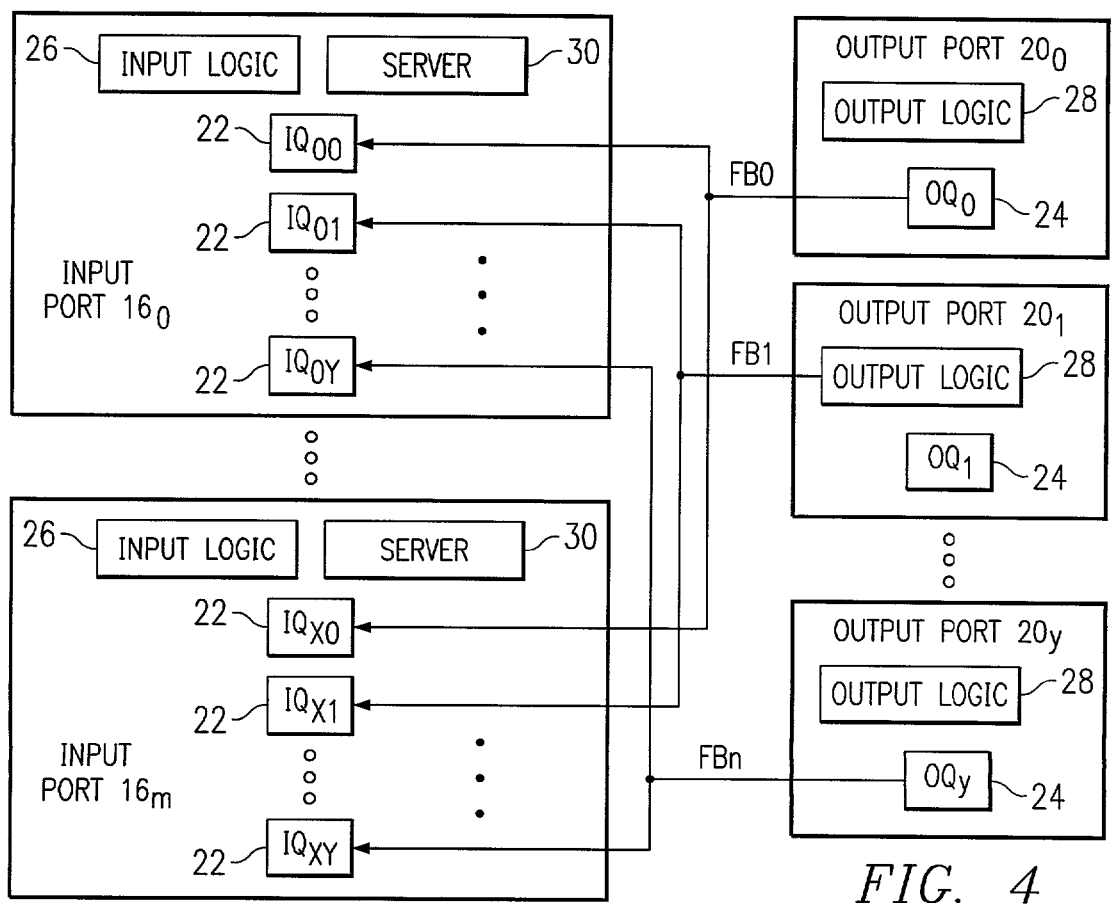
FIG. 4 illustrates the flow of backward force control messages from an output port to an input port of the packet switch of FIG. 3.
Figure 5:
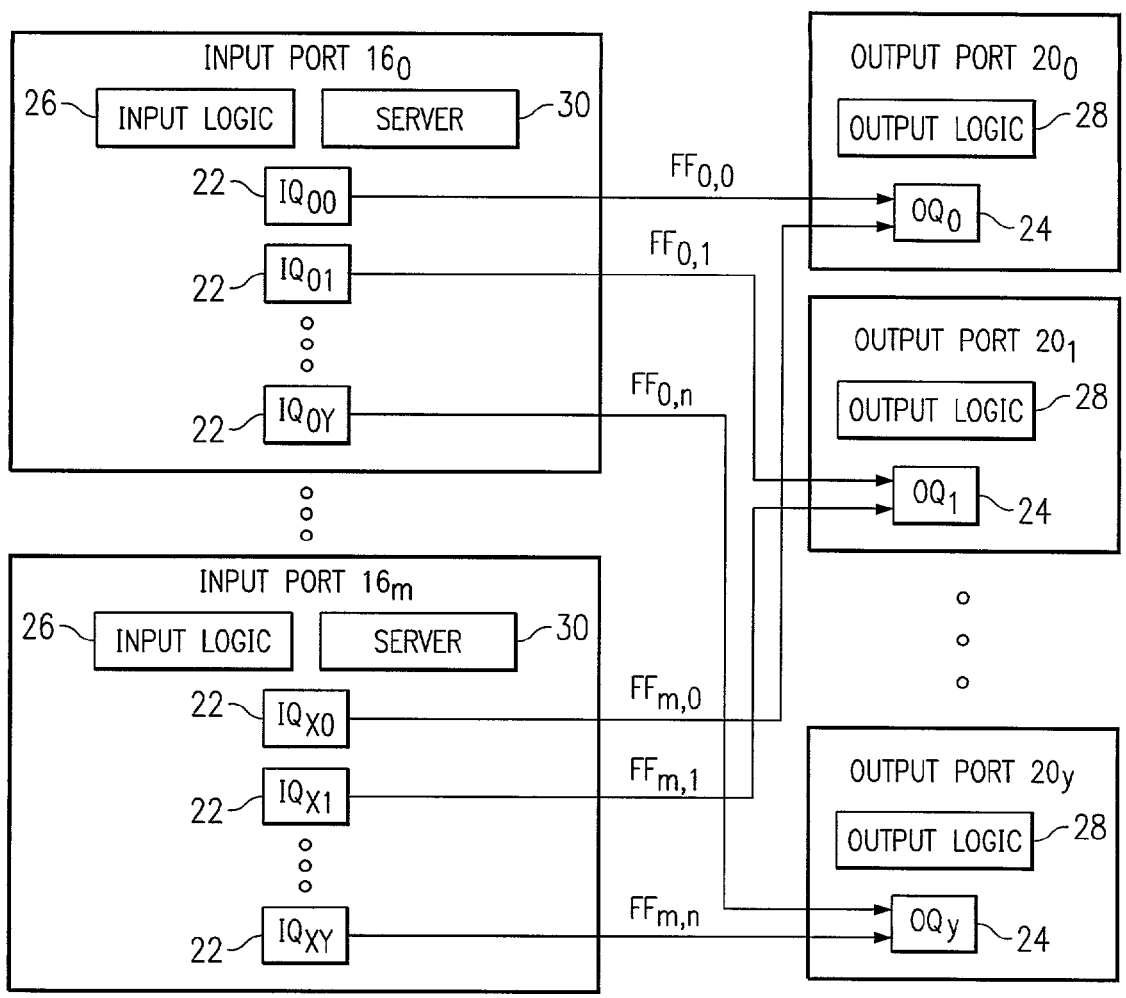
FIG. 5 illustrates the flow of forward force control messages from an input port to an output port of the packet switch of FIG. 3.

FIGS. 4 and 5 illustrate an embodiment of the invention, where the input ports 16 and output ports 20 send forward and backward "force" control messages to one another based on criteria to be discussed hereinbelow. Each input port 16 includes logic 26 for calculating the value of the forward force control messages and each output port 20 includes logic 28 for calculating the value of the backward force control values. Logic 26 could be centralized in each input port 16 for all input queues of an input port or logic 26 could be distributed among the various input queues 22 for an input port 16; i.e., each input queue could have its own logic 26. For purposes of illustration, force control values are shown as being sent from input queues 22 to output queue 24 (forward force messages) or output queues 24 to input queues 22 (backward force messages); however, the path of the control messages could shown as between logic 26 and logic 28. The input ports 16 also may include servers 30 that control transmission of packets into the matrix 18, as described in greater detail in connection with FIG. 6.

FIG. 4 illustrates the preferred embodiment for the force backward (FB) control value. Each output queue 24 outputs a FB control message having the same value to all of the corresponding input queues 22. Hence the output queue 24 of output port $20_0$ outputs $FB_0$ to all queues $IQ_{x,0}$ and output port $20_y$ outputs value $FB_y$ to all input queues $IQ_{z,y}$, for all integer values of z between 0 and x.

As shown in FIG. 5, the input ports 20, however, generate a force forward (FF) control value for each individual input queue 22, which is sent to the output logic of the respective output port 20. Each FF control value is designated $FF_{port, queue}$. Hence the FF control value from the input queue of input queue $IQ_{0,1}$ would be designated as $FF_{0,1}$.

Importantly, the values generated in the present invention control the acceleration of the rate of data packets between a particular input queue 22 and a particular output queue 24. This has been found effective in controlling the occupancy of the queues 22 and 24, while reducing the amount of matrix resources used to transfer the control messages with respect to data packets.

Various methods can be used to generate the force values. In one embodiment, the following configuration parameters are used:

$L_{i,j}$ is the length of occupied portion of input queue j on port i.

$Lo_j$ is the length of occupied portion of output queue j.

$Li_{max}$ and $LO_{max}$ are the maximum lengths of the input and output queues.

$age_{i,j}$ is the age of the packet at the head of input queue j on port i.

$age_{max}$ is the maximum allowable age of a packet in the input queue before it is discarded.

$w_1$ and $w_2$ are weights that represent the relative importance of the length of an input queue and the age of the packet at the head of the input queue, $W_1 >= 0$, $W_2 >= 0$, and $W_1 + W_2 = 1$.

Using these configuration parameters, a force forward value can be calculated as:

$$FF_{i,j} = w_1(Li_{i,j}/Li_{max}) + W_2(age_{i,j}/age_{max}),$$

where $FF_{i,j}$ is calculated at input port i and $0 <= FF_{i,j} <= 1$.

A backward force value is calculated as:

$$FB_j = g_b(Lo_j/LO_{max} - \frac{1}{2}) 2 + ((FF_{0,j} + FF_{1,j} \ldots + FF_{x,j})/(x+1)),$$

where x+1 is the number of input ports and $g_b$ is a positive constant that represents the feedback gain. $FB_j$ is calculated at output port j and $-g_b <= FB_j <= g_b + 1$.

For each input queue 22 there are four values named net force (FN), mass (m), acceleration (a), and service rate (r). Net force depends on forward force and backward force:

$$FN_{i,j} = 1pf(FF_{i,j}) - FB_j,$$

where 1pf( ) is a low pass filter that serves as a damping filter. In a practical implementation, 1pf( ) could be a running average.

Acceleration depends on mass and net force:

$$a_{i,j} = FN_{i,j}/m_{i,j},$$

where mass is a configured attribute of an input queue. The acceleration is the derivative of the service rate:

$$a_{i,j} = r_{i,j}'.$$

In the preferred embodiment, forward force and backward force messages are sent on a regularly scheduled basis. Every time an input queue 22 receives a backward force message, it recalculates $a_{i,j}$ and adds the current $a_{i,j}$ to the previous value of $r_{i,j}$. The service rate (described below), $r_{i,j}$, is constrained such that, $0 <= r_{i,j} <= 1$.

Figure 6:
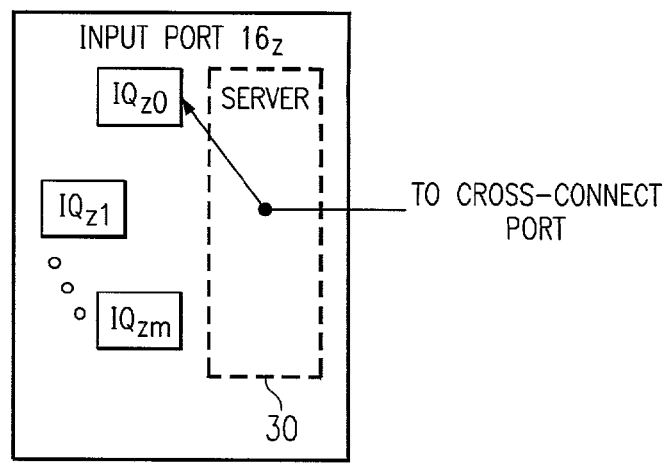
FIG. 6 illustrates a server for controlling the service rate of an input port.

FIG. 6 illustrates the operation of a server 30 for an arbitrary input port $16_z$. Typically, every input queue 22 on the input port 16 cannot send packets to the matrix 18 at the same time. Once each "matrix" cycle, the matrix 18 passes data packets between input ports 16 and output ports 20. On a "control" cycle, control messages are passed between input ports 16 and output ports 20. It is desirable to have a high ratio of matrix cycles to control cycles.

In the following discussion, it is assumed that (1) internal packets are all of the same fixed size, (2) the matrix operates in discrete cycles, and (3) an input port 16 can only send one packet from one input queue 22 in one matrix cycle; this is known as having one server per input port.

The server 30 is a logic circuit that connects one of input queues 22 of an input port 16 to the matrix 18 at a time. When an input queue 22 is not empty, it makes a request to the server. Each cycle, the server 30 picks one input queue 22 from among all the input queues 22 that have made requests and connects that queue to the matrix 18. The chosen input queue 22 sends one packet. The server 30 can be designed not to favor one queue over another. For example, it may select input queues 22 in round-robin fashion. If an input port 16 has more than one connection to the matrix 18, it is possible to have more than one server per port.

As described above, the service rate, $r_{i,j}$, is an attribute of an input queue, and it is a number between 0 and 1. In the model above, the service rate controls the probability that a non-empty queue will make a request to the server. So, if an input queue has a service rate of 0.5 and it is non-empty, there is a 50% chance the queue will make a request for service in the current matrix cycle.

In the equations above, the net force (FN) tends to be zero when the output queue is half full. When an output queue 24 is more or less than half full, its associated net force tends to be negative or positive, respectively. This is an imperfect tendency because of transmission delays and the low pass filter applied to the forward force function. A balance point can be defined as the length of the output queue at which net force and acceleration tend to be zero. Typically, using the calculations for FF, FB and FN described above, the balance point of an output queue is 0.5.

It is possible to modify the backward force equation such that the balance point is a configuration option. If b is the balance point of the output queue and $0<=b<=1$:

$$FB_j=g_b(Lo_j/LO_{max}-b)(1/(1-b))+((FF_{0,j}+FF_{1,j}\ldots +FF_{x,j})/(x+1)),$$

where x+1 is the number of input ports.

The larger the balance point the more full the output queue 24 tends to be during normal operation and the less full the respective input queue 22 tends to be. If the balance point is greater than zero, the service rate tends to be "1" under lightly loaded conditions. This allows for minimal latency in a lightly loaded situation. Giving different output queues different balance points can give them different qualities of services.

The operation of the network 10 can also be modified by adjusting the mass of an input queue 22. Increasing the mass of an input queue 22 decreases the variance of its output data rate. It also reduces the variance of the output data rate of the corresponding output queue 24. A higher mass for an input queue 22 also decreases the average length of the output queue 24 and increases the average length of the input queue 22.

Decreasing the variance of the output data rate of the output queues is desirable because it reduces the general of burstyness of all traffic in the network. This benefits downstream routers.

It is possible to modify the scheme described above such that each input queue 22 has two masses m1 and m 2. Acceleration is calculated as follows:

If $FN_{i,j}>0$ then $a_{i,j}=FN_{i,j}/m1_{i,j}$

If $FN_{i,j}<=0$ then $a_{i,j}=FN_{i,j}/m2_{i,j}$

Generally $m2_{i,j}$ would be much smaller than $m1_{i,j}$.

The advantage to this scheme is that when the output queue 24 begins to become full, it can throttle the input queues at a faster rate. This reduces the probability that the output queue 24 will overflow.

Figure 7:
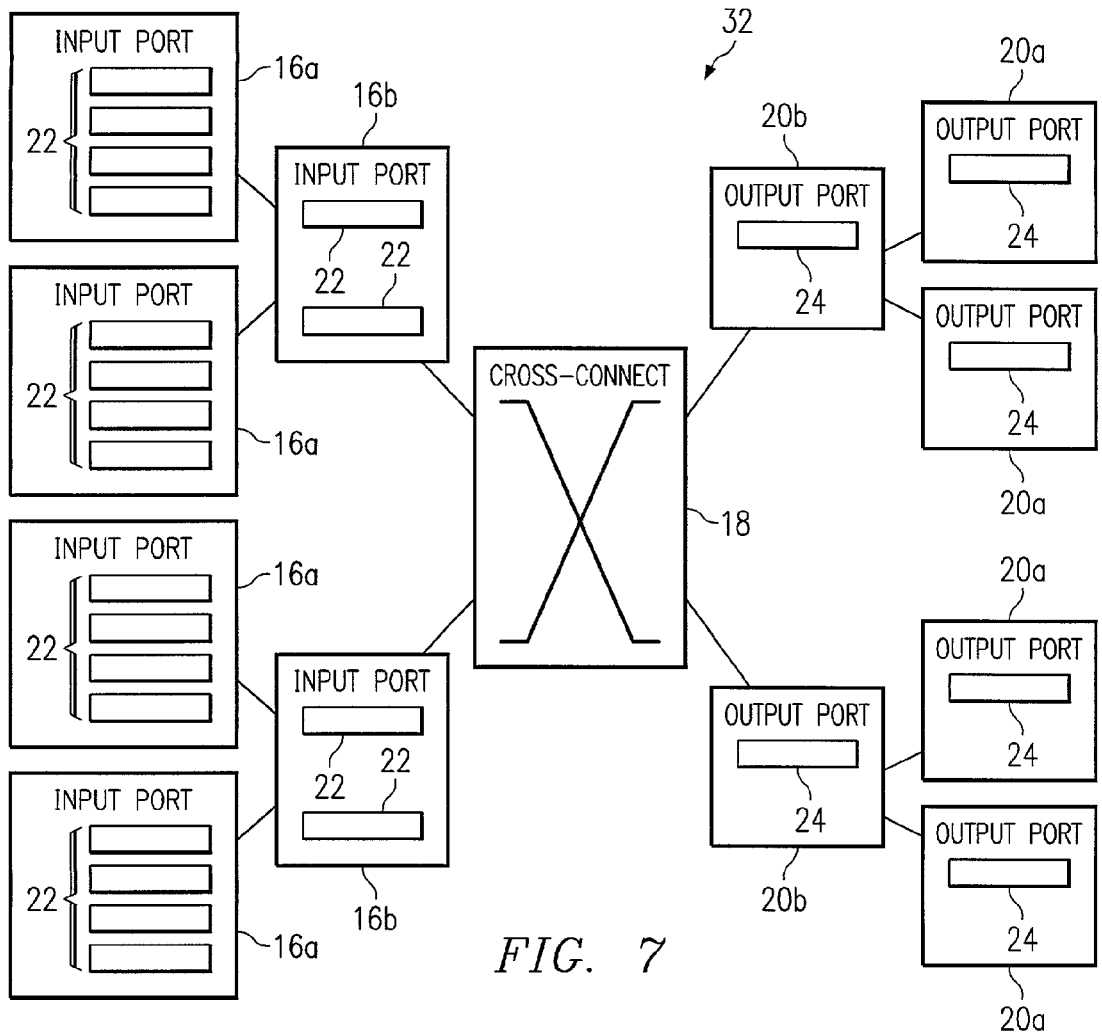
FIG. 7 illustrates a block diagram of a packet switch using multi-level input and output ports.

FIG. 7 illustrates a multi-stage packet switch 32, in which there can be two or more levels of input queues 16 (shown as outer input queues 16a and inner input queues 16b) and two or more levels of output queues 20 (shown as outer output queues 20a and inner output queues 20b). Decreasing the variance of the output data rate of the input queues 16 is also desirable in a multi-stage switch. In such a system the force messages would be exchanged between the outer input queues 16a and outer output queues 20a only.

The inner input queues 16b and inner output queues 20a have higher data rates than the outer queues 16a and 20a. For this reason the inner queues 16b and 20b are more expensive than the outer queues. There is a cost advantage to keeping the lengths of the inner queues 16a and 20a small. A small variance in the data rate of the data entering the inner input queues 16a has this effect.

Mass reduces the rate at which the output data rate of an input queue 16 can change. For this reason, control messages can be less frequent. Since control messages consume resources in the matrix 18, this increases the fraction of the matrix capacity that can be devoted to carrying payload. Increasing the mass of an input queue 16 has the same effect as proportionally decreasing the forward and backward forces acting on that queue.

Instability in the packet switch 12 can be addressed by the damping filter function. Changing the damping filter function, 1pf( ), has an effect similar to changing a queue's mass. A stronger damping filter reduces the probability of an output queue overflowing, but it increases the probability of an input queue overflowing. A stronger damping filter also reduces the variance of the output data rates of both the input queues 22 and output queues 24. Like mass, the damping filter reduces the rate at which the output data rate of an input queue 22 can change. This increases the fraction of the matrix capacity that can be devoted to carrying payload.

In some embodiments of a packet switch 12, different input queues 16 may be given different configuration parameters pursuant to different quality of service associated with the input queues. For example, jitter occurs when time interval between two packets is not the same when they are received, as it was when they were sent. Jitter is a particular problem for streaming audio and video. A flow of packet between two host systems can increase in jitter as it passes through a switch 12.

An input queue 16 (or multiple input queues) in a switch 12 can be configured to have less jitter by leaving the configuration of all other queues the same and modifying the configurations of this queue in the following ways:

1) Increase its forward force by multiplying its forward force by a scaling constant; and/or
2) Change its forward force weights to favor packet age over queue length.

Figure 8:
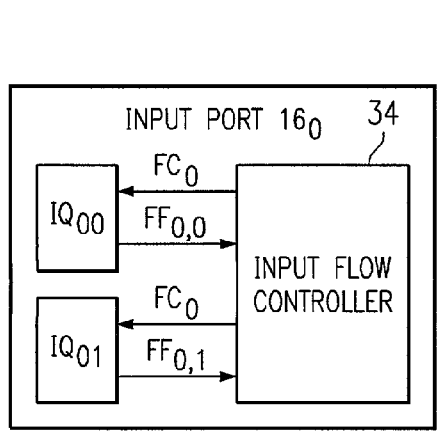
FIG. 8 illustrates a block diagram of a input port using an input flow controller.

FIG. 8 illustrates an alternative embodiment of the invention where an input flow controller 34 is used in each input port 16. The input flow controller 32 generates a force FC. In this case, acceleration would be equal to:

$$a_{i,j}1pf(FF_{i,j})-(w_1FB_j+W_2FC_i),$$

where $w_1$ and $w_2$ are weights that determine the relative importance of backward force and input flow controller force. Further, $$FC_1=g_e((r_{i,0}+r_{i,1}+\ldots+r_{i,x})/R_i-\frac{1}{2})2+((FF_{i,0}+FF_{i,1}\ldots+FF_{i,x})/(x+1))$$

where $R_i$ is the maximum bandwidth an input port can send toward the matrix, and $g_c$ is a constant that represents the gain on the input flow controller's feedback.

It may be desirable to reduce sudden changes in the service rate. One method of reducing sudden changes is to use a non-constant service rate. In one matrix cycle, payload data packets are sent from input queues 22 to output queues 24. In one control cycle, forward force packets are sent from input queues 22 to output queues 24, and backward force packets are sent from output queues 24 to input queues 22. In the scheme described above, it assumed that there are multiple matrix cycles for every control cycle. As described, the service rate, $r_{i,j}$, is changed once every control cycle, and remains constant for multiple matrix cycles.

The problem with this the approach is that it causes sudden changes in service rate. This causes burstyness in the input queues output data rate. This burstyness becomes larger as the number of matrix cycles per control cycle becomes larger. It is desirable to have a large number of matrix cycles per control cycle, because this reduces the fraction of the matrix capacity that is consumed by control packets. In some instances, it may be preferable to allow the service rate to vary during a single control cycle.

The simplest way to allow the service rate to vary during a control cycle is to apply the same acceleration to the service rate every matrix cycle. Assume the control cycles within a matrix cycle are numbered from 1 to N where N is the number of matrix cycles per control cycle. Further assume that at the end of the previous control cycle, the acceleration for input queue i,j was $a_{i,j}$, and for any control cycle, k, within the matrix cycle (where 1<=k<=N) the service rate for input queue i,j is $r_{i,j,k}$, let:

$$r_{i,j,k} = r_{i,j,k-1} + (a_{i,j}/N).$$

A more sophisticated approach is to calculate a new net force every matrix cycle, and use the net force value calculated at the end of a control cycle only as an upper bound for the per-matrix-cycle net force. As described above, the backward force and net force calculated at the end of a control cycle are $FB_j$ and $FN_{i,j}$. Let the forward force calculated any matrix cycle, k, be $FF_{i,j,k}$, let the net force calculated that matrix cycle be $FN_{i,j,k}$, and let the acceleration calculated that matrix cycle be $a_{i,j,k}$. Every matrix cycle the new net force is:

$$FN_{i,j,k} = \min(FN_{i,j}, 1pf(FF_{i,j,k}) - FB_j).$$

The new acceleration is:

$$a_{i,j,k} = FN_{i,j,k}/M_{i,j}$$

And the new service rate is:

$$r_{i,j,k} = r_{i,j,k-1}(a_{i,j,k}/N).$$

An alternative formula for the per-matrix-cycle net force leaves off the low pass filter:

$$FN_{i,j,k} = \min(FN_{i,j}, FF_{i,j,k} - FB_j).$$

The advantage a non-constant service rate is a reduction in sudden changes in service rate, which causes burstyness in the input queues output data rate. The disadvantage is that this approach is more complicated. The advantage of recalculating the net force every matrix cycle is that it allows the service rate of an input queue to grow more slowly or decline faster during a control cycle. This allows the server to give resources to other queues.

Another variation would be to set the service rate as a constant times the net force:

$$r_{i,j} = FN_{i,j} * k_{i,j},$$

where $k_{i,j}$ is a constant.

With this scheme, the service rate does not change during a control cycle. The advantage to this scheme is that it is simpler, and simulations show that it does a good job of controlling the lengths of the input and output queues.

The constant $k_{i,j}$ can be made asymmetric such that:

If $FN_{i,j} > 0$ then $a_{i,j} = FN_{i,j} * k1_{i,j}$

If $FN_{i,j} <$ or $= 0$ then $a_{i,j} = *k2_{i,j}$

It is possible to modify the scheme described above to have only backward force packets. In this approach forward force messages are eliminated and the formula for calculating backward force becomes:

$$FB_j = g_b(Lo_j/Lo_{max})$$

In this scheme the output queue 24 has no balance point. Net force tends to be zero when the input queues and the output queue are the same length (provided gb=1 and forward force does not depend on packet age). The advantage to this approach is that it is simpler and uses less matrix capacity. The disadvantage is that it does not do as good a job of reducing the variance of the output data rate of the input queue.

The present invention provides significant advantages over the prior art. By controlling the acceleration of the rate of packets between a input queue and an output queue, a desired balance can be maintained, without a heavy overhead of control messages through the matrix.

Figure 9:
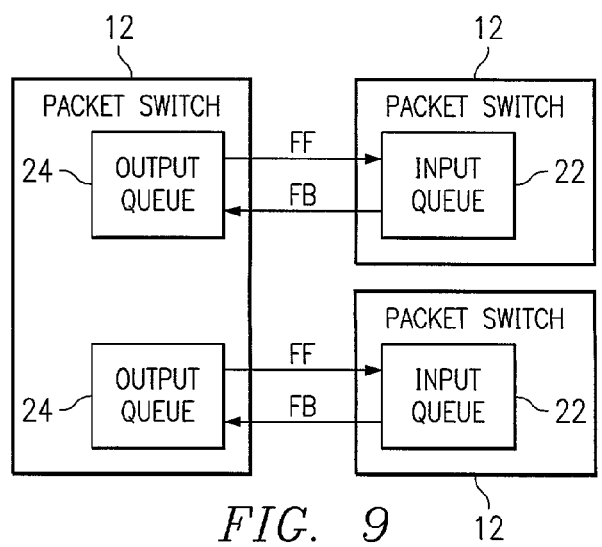
FIG. 9 illustrates a network using inter-switch control messages to control data flow between packet switches.

FIG. 9 illustrates an embodiment of a network 40, where packet switches 12 use the concepts described above for controlling the flow of packets between input and output queues of different packet switches 12, rather than between input and output queues of the same packet switch. In this embodiment, an output queue 24 of a packet switch 12 will send a force forward control message to an input queue 22 of a different packet switch 12. Similarly, the input queue 22 will send a force backward control message to the associated output queue. The calculation and handling of the inter-switch messages can have the same properties as those of the intra-switch messages described above.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A packet switch comprising:
    one or more output queues for temporarily storing packets to be output from the packet switch;
    one or more input ports each comprising one or more input queues for temporarily storing received packets, wherein each input queue is associated with one of said output queues and wherein each output queue is associated with input queues from different input ports;
    a matrix for passing information between said inputs queues and said output queues;
    control circuitry for controlling the rate of change of a transfer rate between associated input queues and output queues, and said control circuitry computes an acceleration value for each input queue.

2. The packet switch of claim 1 wherein said acceleration value for each input queue is based on a forward force for the input queue and a backward force for the output queue associated with the input queue.

3. The packet switch of claim 1 wherein said acceleration value for each input queue is based on a net force difference between said forward force for the input queue and said backward force for the associated output queue.

4. The packet switch of claim 3 wherein said forward force for each input queue is based on a length of an occupied portion of the input queue and the age of the oldest packet in the input queue.

5. The packet switch of claim 4 wherein said forward force for each queue is further dependent upon a length weighting factor and an age weighting factor.

6. The packet switch of claim 2 wherein said backward force for each output queue is dependent upon a length of an occupied portion of the output queue.

7. The packet switch of claim 6 wherein said backward force for each output queue is further dependent upon a predetermined balance point for the output queue.

8. The packet switch of claim 2 wherein the acceleration for each input queue is further dependent upon a mass value associated with the input queue.

9. The packet switch of claim 8 wherein said mass value may vary depending upon forward and backward forces associated with the input queue.

10. The packet switch of claim 1 wherein the transfer rate for each input queue is indicative of the probability of the input queue making a request to send a packet and the acceleration value is added a current transfer rate to determine a new transfer rate.

11. A packet switch comprising:
one or more output queues for temporarily storing packets to be output from the packet switch;
one or more input ports each comprising:
multiple input queues for temporarily storing received packets, wherein each input queue is associated with one of said output queues and wherein each output queue is associated with input queues from different input ports;
control circuitry for selectively generating requests, on each cycle, from a group of input queues that have packets to send on that cycle, responsive to a calculated transfer rate for that input queue; and
a server for selecting, on each cycle, one or more from said group to output a packet; and
a matrix for passing information between said inputs queues and said output queues.

12. The packet switch of claim 11 wherein said control circuitry computes an acceleration value for the input queue.

13. The packet switch of claim 12 wherein said acceleration value for each input queue is based on a forward force for the input queue and a backward force for the output queue associated with the input queue.

14. The packet switch of claim 12 wherein said acceleration value for each input queue is based on a net force difference between said forward force for the input queue and said backward force for the associated output queue.

15. A network comprising:
a plurality of interconnected packet switches, each packet switch comprising:
input and output queues, where output queues of one switch are coupled to and associated input queue of another switch;
control circuitry for controlling the rate of change of a transfer rate from an output queues to an associated input queue of another switch, said control circuitry computes an acceleration value for the input queue.

16. The network of claim 15 wherein said acceleration value for each input queue is based on a forward force for the input queue and a backward force for the output queue associated with the input queue.

17. The network of claim 15 wherein said acceleration value for each input queue is based on a net force difference between said forward force for the input queue and said backward force for the associated output queue.

18. A method of passing packets between input ports and output ports of a packet switch, wherein each output port has one or more output queues for temporarily storing packets to be output from the packet switch and each input port has one or more input queues for temporarily storing received packets, each input queue being associated with one of said output queues, comprising the steps of:
transferring packets between said input queues and associated output queues in accordance with a calculated transfer rate for each pair of associated input and output queues; and
periodically calculating a rate of change of the transfer rate between each of said pairs, said calculating step comprises the step of computing an acceleration value for each input queue; and
changing the transfer rate in accordance with the rate of change.

19. The method of claim 18 wherein said step of computing an acceleration value comprises the step of calculating an acceleration value for each input queue based on a forward force for the input queue and a backward force for the output queue associated with the input queue.

20. The method of claim 19 wherein said step of calculating an acceleration value comprises the step of calculating an acceleration value for each input queue based on a net force difference between said forward force for the input queue and said backward force for the associated output queue.

21. The method of claim 20 wherein said forward force for each input queue is based on a length of an occupied portion of the input queue and the age of the oldest packet in the input queue.

22. The method of claim 21 wherein said forward force for each queue is further dependent upon a length weighting factor and an age weighting factor.

23. The method of claim 19 wherein said backward force for each output queue is dependent upon a length of an occupied portion of the output queue.

24. The method of claim 23 wherein said backward force for each output queue is further dependent upon a predetermined balance point for the output queue.

25. The method of claim 18 wherein the acceleration for each input queue is further dependent upon a mass value associated with the input queue.

26. The method of claim 25 wherein said mass value may vary depending upon forward and backward forces associated with the input queue.

27. The method of claim 18 wherein said transfer rate for each input queue is indicative of the probability of the input queue making a request to send a packet.

* * * * *